United States Patent [19]

de Wit et al.

[11] Patent Number: 5,420,249
[45] Date of Patent: May 30, 1995

[54] PROCESS FOR THE RECOVERY OF α-LACTALBUMIN AND β-LACTOGLOBULIN FROM A WHEY PROTEIN PRODUCT

[75] Inventors: Jacobus N. de Wit, Renkum; Henricus Bronts, Heesch, both of Netherlands

[73] Assignee: Campina Melkunie B.V., Zaltbommel, Netherlands

[21] Appl. No.: 170,497

[22] Filed: Dec. 20, 1993

[30] Foreign Application Priority Data

Dec. 23, 1992 [EP] European Pat. Off. ............ 92204074

[51] Int. Cl.$^6$ .................... C07K 3/28; A61K 35/20
[52] U.S. Cl. ................................. 530/366; 530/365; 530/386
[58] Field of Search .................... 530/366, 386, 365

[56] References Cited

U.S. PATENT DOCUMENTS

| | | | |
|---|---|---|---|
| 2,595,459 | 5/1952 | Hull | 530/366 |
| 2,765,232 | 10/1956 | Rodgers et al. | 426/583 |
| 3,234,199 | 2/1966 | Reid et al. | 530/366 |
| 4,781,238 | 11/1988 | Rialland et al. | 530/366 |
| 4,834,994 | 5/1989 | Kuwata et al. | 426/271 |

FOREIGN PATENT DOCUMENTS

| | | |
|---|---|---|
| 038732 | 10/1981 | European Pat. Off. |
| 2345939 | 3/1976 | France |
| 2443867 | 12/1978 | France |
| 0016292 | 2/1979 | France |
| 2671697 | 7/1992 | France |
| 1268138 | 11/1986 | Japan |
| 8911226 | 11/1989 | WIPO |

OTHER PUBLICATIONS

Ohtomo, Hideo et al., "Elimination of β-Lactoglobulin from Whey . . . ", Nippon Shokuhin Kogyo Gakkaishi, vol. 35 (11) pp. 755-762, 1988.

Patocha, J. et al., "Heat Stability of Isolated Whey . . . ", Milchrissenschaft, vol. 42 (11), pp. 700-705, 1987.

Pearce, R. J., "Thermal Separation of β-Lactoglobulin and α-Lactalbumin . . . ", Aust. J. Dairy Technol., vol. 38 (4) pp. 144-149, 1983.

Marshall, K. R. et al., N.Z. J. Dairy Sci. Technol., vol. 11(1), pp. 69-70, 1976 CA85(11):76484m.

*Primary Examiner*—Michael G. Wityshyn
*Assistant Examiner*—C. Sayala
*Attorney, Agent, or Firm*—Cooper & Dunham

[57] ABSTRACT

This invention relates to a process for the recovery of α-lactalbumin and/or β-lactoglobulin enriched whey protein concentrate from a whey protein product. The process comprises the following steps:

a) incubating a solution comprising whey protein product with a calcium-binding ionic exchange resin in its acid form to initiate the instabilization of α-lactalbumin, b) adjusting the pH of the treated protein product solution to a value between 4.3 and 4.8, after separation of the resin, c) incubating the protein product solution at a temperature between 10 and 50° C. to promote the flocculation of α-lactalbumin, d) fractionating the proteins in the protein product solution at pH 4.3-4.8, providing an α-lactalbumin enriched fraction and a β-lactoglobulin enriched fraction, e) raising the pH of the α-lactalbumin enriched fraction sufficiently to solubilize the α-lactalbumin fraction, and f) optionally raising the pH of the β-lactoglobulin enriched fraction sufficiently to neutralize the β-lactoglobulin fraction.

17 Claims, 6 Drawing Sheets

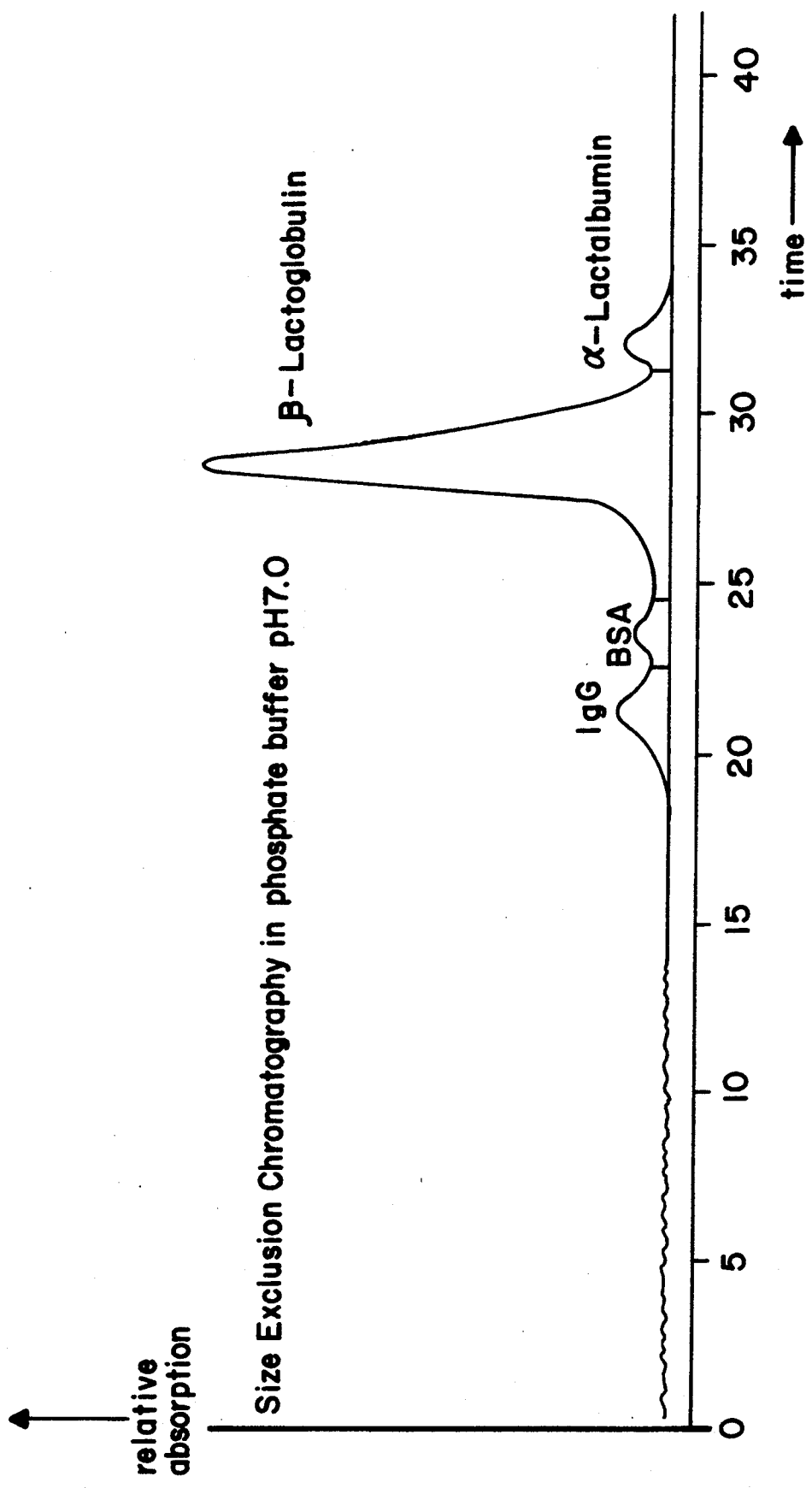

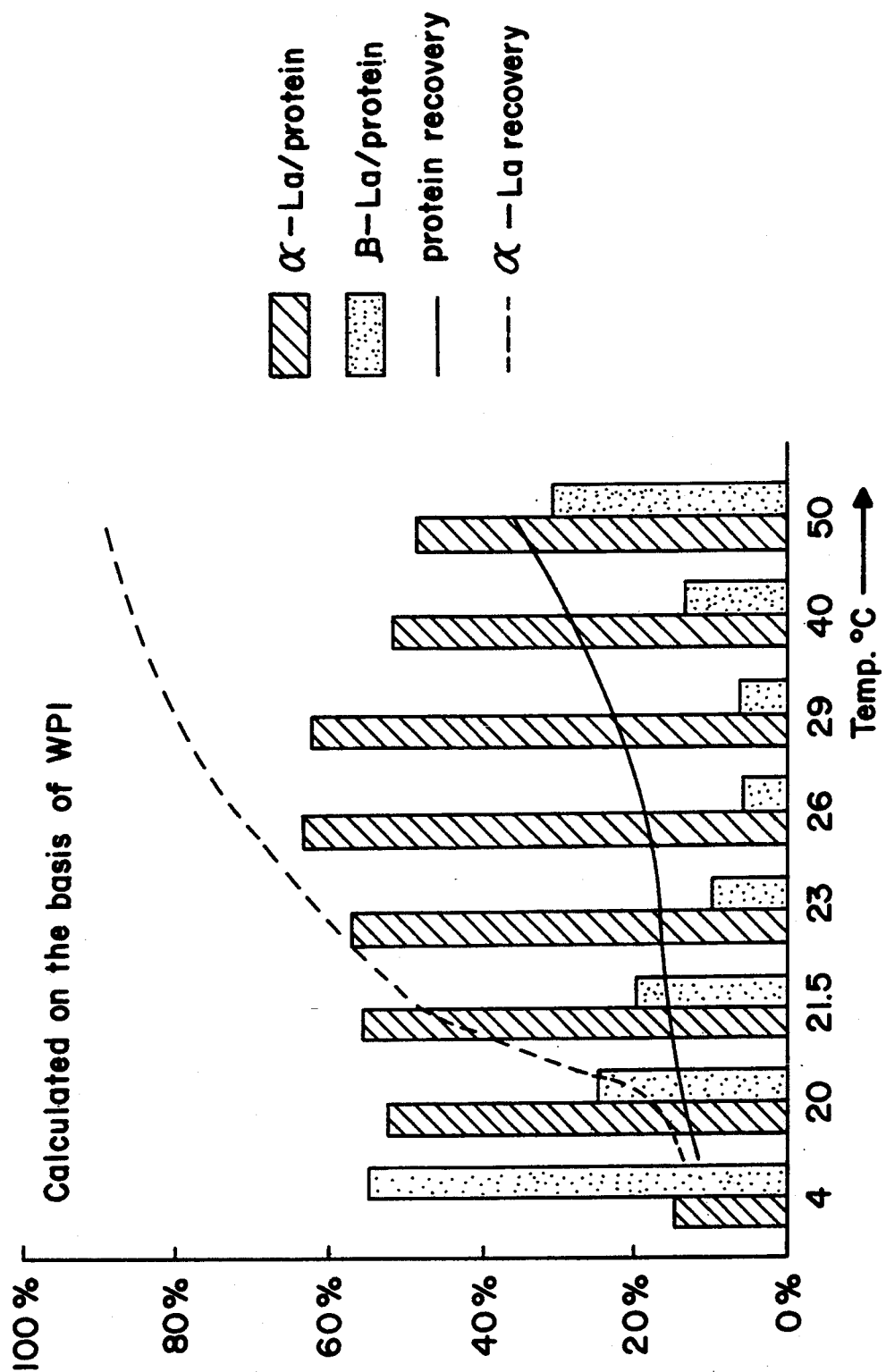

PROCESS FOR THE RECOVERY OF α-LACTALBUMIN AND β-LACTOGLOBULIN FROM A WHEY PROTEIN PRODUCT

The present invention relates to a process for the recovery of α-lactalbumin and/or β-lactoglobulin enriched whey protein concentrate from a whey protein product. More in particular the invention relates to a process for the selective fractionation of undenatured α-lactalbumin and β-lactoglobulin from the proteins in whey.

BACKGROUND OF THE INVENTION

The proteins in whey are divided into two principal groups, i.e. the globulin fraction containing mainly β-lactoglobulin (β-Lg) and immuno-globulins (Ig-G), and the albumin fraction including α-lactalbumin (α-La) and blood serum albumin (BSA). β-Lg is a characteristic protein in milk of ruminants, but does not occur in human milk. α-La is found in the milk of all mammals and represents a major protein in human milk. This protein is largely used both in preparations of humanized milk and compositions of non-allergenic milk products for infants which are allergic to β-Lg of cow's milk. α-La represents about 25% of the whey proteins in bovine milk, whereas this contribution in human milk amounts over 40%.

Numerous processes have been proposed for the preparation of α-La or β-Lg enriched fractions from milk or whey, according to various techniques. These techniques may be split-up in three main categories viz:

1) Selective precipitation of α-La.
2) Specific separation of β-Lg.
3) Selective fractionation of α-La and β-Lg.

As mentioned hereinabove the process according to the present invention is of the latter category.

Selective fractionation processes are based on relatively simple physical separation techniques which do not change the natural properties of the whey components. Major advantages of these techniques are the relatively easy scale-up to industrial processes, and the fact that said techniques usually result in valuable by-products with a minimum of waste streams.

The selective fractionation processes are mainly based on membrane separation, using membranes which allow the native α-La molecules to pass through into the permeate.

U.S. Pat. No. 4,711,953 describes a process using UF-membranes with a cut-off of 50,000 giving an α-La/β-Lg ratio of 3/2 in the permeate. It is known in the art that this ratio may be increased by using previously defatted whey, obtained by micro-filtration, as described in e.g. WO/89 11 226.

EP-A 0 311 283 teaches the use of UF-membranes, having a cut-off of 100,000, for achieving an α-La/β-Lg ratio of at the most 3/1 in the permeate.

NL-A-9102003 describes the use of microfiltration for skimmilk after a preheat treatment at 75°–85° C. for 15 minutes. This results in an α-La/β-Lg ratio of upto 2.7 in the permeate.

All these prior art techniques have the advantage of keeping the whey proteins in their native (globular) state, which facilitates their separation through membranes on the basis of different molecular sizes. It is, however, disadvantageous, that the separation characteristics of the membranes may change during a filtration process as a consequence of membrane fouling. Moreover, slightly damaged or aggregated α-La molecules in whey are rejected by membranes, giving a reduced yield of α-La-enriched whey protein permeate.

SUMMARY OF THE INVENTION

In accordance with the present invention it has been found that the α-La/β-Lg ratio can be substantially improved and controlled by a specific pretreatment of a whey protein product before the fractionation step. The process according to the invention may provide undenatured protein products of any desired ratio of α-La over β-Lg between about 0.1 and about 10. In addition, minimal waste streams are generated. A further advantage of this method is that the separation of α-La from β-Lg is not hampered by entrapped β-Lg in aggregates of α-La.

DESCRIPTION OF THE DRAWINGS

In the accompanying specification the invention and the indicated benefits obtainable from the practice thereof are described with reference to the drawings wherein:

FIG. 1B similarly illustrates a chromatogram showing the recovery of β-lactoglobulin from a mixture thereof with α-lactalbumin;

FIG. 2 graphically illustrates recovery of the total protein α-lactalbumin and β-lactoglobulin, in accordance with the practices of this invention;

FIG. 4 illustrates the optimal separation of α-lactalbumin and β-lactoglobulin between calcium-induced pH values of 4.9 and 3.9; and wherein

Figure 1A:
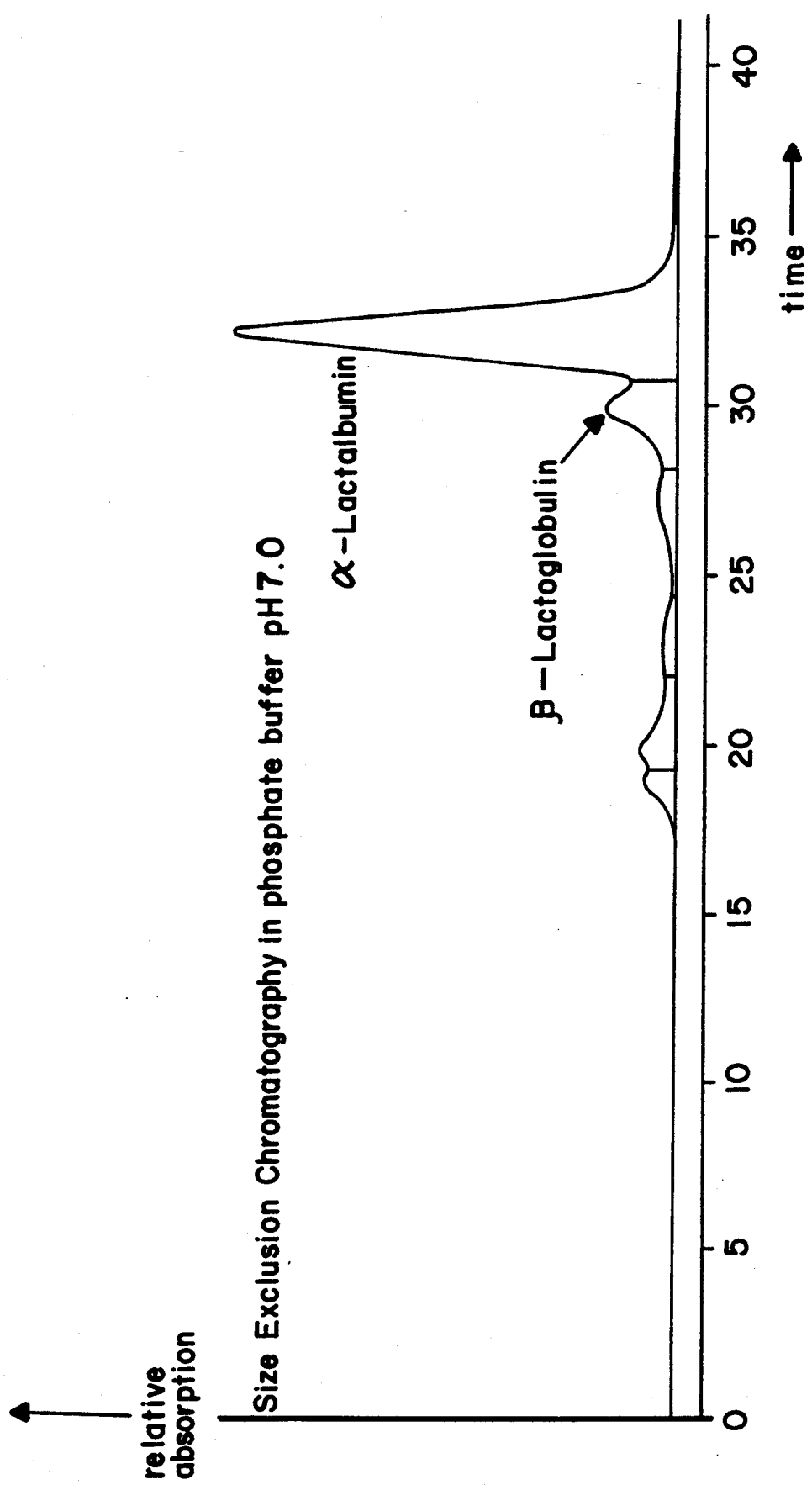
FIG. 1A graphically illustrates a chromatogram with respect to the separation of α-lactalbumin and β-lactoglobulin and illustrates the percent recovery of α-lactalbumin from the mixture of these compounds.

The fractionation process according to the present invention relates to specific differences in molecular characteristics of native α-La and β-Lg molecules, apart from the molecular sizes. The present invention makes use of the fact that the stability of α-La molecules in whey reduces substantially by using calcium-binding cation exchangers.

It is essential in this procedure, that calcium ions, which stabilize α-La proteins, are not substantially removed in previous desalting processes, which are commonly used in the production of whey protein concentrates. Preceeding desalting processes should preferentially take place at pH-values above 5.0, e.g. by ultrafiltration and/or diafiltration of sweet or neutralized acidic whey. In the case that the whey protein concentrate is decalcified in a too high degree, it is possible to readjust the average calcium content of the α-La to a desired degree by contacting the concentrate with a calcium ion providing source.

The process of the invention for the recovery of α-lactalbumin and/or β-lactoglobulin enriched whey protein concentrate (WPC) from a whey protein product is characterized by the following steps:

a) incubating a solution comprising said whey protein product with a calcium-binding ionic exchange resin in its acid form to initiate the instabilization, b) adjusting the pH of the treated protein product solution to a value between 4.3 and 4.8, after separation of said resin, c) incubating said protein product solution at a temperature between 10° and 50° C. to promote the flocculation of α-lactalbumin, d) fractionating the proteins at pH 4.3–4.8, providing an α-lactalbumin enriched fraction and a β-lactoglobulin enriched fraction, e) raising the pH of the α-lactalbumin enriched fraction sufficiently to solubilize the α-lactalbumin fraction, and f) optionally raising the pH of the β-lactoglobulin enriched fraction sufficiently to neutralize the β-lactoglobulin fraction.

The term "whey protein product" refers to whey or to a whey protein concentrate obtained from whey. The whey protein concentrate may also be a whey protein powder. A whey protein concentrate to be used as a starting product in the process according to the invention may be prepared in any conventional way. Said whey protein concentrate may for example be obtained from skimmed and/or clarified whey. The whey may be concentrated and/or desalted in a common way, e.g. by ultrafiltration and/or diafiltration.

If a whey protein powder is used as starting product, this powder must be brought into solution before it is subjected to step a) of the process according to the invention.

As mentioned hereinabove, the whey protein concentrate used as starting product in the process according to the invention may be prepared in any conventional way. Normally, the fines of curd or denatured whey proteins and the residual crude fat components are previously removed from a whey solution by centrifugation. Then the skimmed and clarified whey is subjected to a desalting process, preferably by ultrafiltration and/or diafiltration, resulting in a retentate and a permeate.

The protein concentration in the initial whey protein product is preferably not more than 15%, more preferably varies between 0.7 and 15% and most preferably varies between 3 and 15%.

In a preferred embodiment of the process according to the invention the initial whey protein concentrate is defatted. Thereto, the retentate obtained from the above ultrafiltration is, e.g., diluted to about a 1% whey protein solution. Said diluted solution is acidified to pH 4.6 for defatting by for example microfiltration as described in NL-A-9200708, or sedimented as described in NL patent 173912.

The fat-rich fraction, which contains about 20% fat and about 60% proteins, may be mixed with an ultrafiltration permeate obtained in the preparation of the whey protein concentrate from whey. This mixture results in a whole milk equivalent, which may e.g. be used for calve feeding.

In the case that the whey protein product is not defatted, the fat fraction will end up in the α-La fraction. An additional disadvantage is that other whey proteins are adhered to or included in the fat fraction. This will result in a somewhat lower α-La on protein ratio.

The optionally defatted whey protein solution is concentrated by UF after neutralisation, resulting in a lactose-rich fraction as permeate and a 10% whey protein isolate (WPI).

The degree in which cations in the initial whey protein product are removed by the above mentioned and commonly used concentrating and/or desalting processes, esp. by ultrafiltration or diafiltration, critically determines the pH-reduction which occurs upon the addition of a specific amount of the cation exchange resin in the acid form. Said in other words, the pH-value obtained after the addition of an excess of ion exchanging resin in its acid form depends on the cation content of the whey protein product.

The most economic embodiment of the process according to the invention, is the embodiment in which the treatment with the ion exchanging resin leads to a whey protein product having a pH-value between 3.8 and 4.8.

This embodiment gives the best results in recovery of α-La and β-Lg when the initial whey protein concentrate is obtained from whey desalted by e.g. ultrafiltration or diafiltration at a neutral pH. If the pH is lowered during the desalting steps, or the whey proteins have been exposed to a medium having an acidic pH, the α-La/β-Lg ratio in the α-La enriched fraction will be lower. Based on these findings the pH of the initial whey protein concentrate is preferably neutral, i.e. having a pH of at least 5.

Hence, precipitates having as high a α-La/β-Lg ratio as possible may be prepared from a starting whey protein concentrate which has not been subjected to acidic conditions, and which is desalted to such a degree, that the content of cations is sufficient to lower the pH-value to a value between 3.8–4.8 upon addition of a cation exchanging resin in its acid form. Correction of the pH of a treated whey protein product outside the critical pH range of 3.8–4.8 to about 4.6 by using acid or base results in a limited instability and a reduced recovery of α-La.

The incubation of a solution comprising the whey protein product with a calcium-binding ionic exchange resin in its acid form is carried out to initiate the instabilization of α-La. If the α-La becomes unstable, the whey protein product solution becomes turbid.

The extraction of calcium ions from protein molecules will normally be carried out at a temperature below 50° C. If the proteins are maintained at a temperature above 50° C. and at a pH-value less than 5, the instabilization of α-La will occur too fast. These molecules will aggregate and precipitate in a rather uncontrolled way, with the inclusion of other whey proteins, esp. β-Lg. It will be clear that this affects the purity of the products desired. Generally, step a) of the process according to the invention is carried out at a temperature between 10° and 50° C.

According to the invention, the calcium ions are extracted from the proteins by the application of calcium binding ion exchanging resins. Preferentially, the calcium-binding ion-exchanger used in step a) of the process is a strong acid ion exchanging resin.

The incubation time of the cation exchanging step a) is at least 30 minutes.

The pH-value of the solution, after the incubation according to step a), will preferably vary between 3.5 and 5.0.

As mentioned hereinabove, in the most economical embodiment, the addition of the ion exchanging resin is controlled in such a way that the pH of the ion exchanged whey protein concentrate varies between 3.8 and 4.8. To increase the yield and/or the α-La/β-Lg ratio, the pH in step b) is adjusted to a value between 4.3 and 4.8, more preferably to about 4.6. The pH traject of 4.55–4.65 gives optimal results in the steady precipitation of α-La, without substantial entrapment of β-Lg.

It has worked out that the flocculation of α-La should progress quietly. The temperature of the α-La containing concentrate should not exceed 50° C. At temperatures higher than 50° C. insoluble α-La molecules will tend to aggregate too quickly, as a consequence of which the aggregates formed will contain entrapped β-Lg molecules.

More in particular, the temperature in step c) preferably varies between 20° and 40° C., most preferably between 25° and 30° C. In the latter temperature range a precipitate is obtained comprising at least 60% α-La and at the most 10% β-Lg.

The incubation time of step c) is normally at least 30 minutes in order to secure a complete flocculation of the α-La molecules which are unstable in the solution under the circumstances described.

The protein precipitate, which essentially contains α-La, is separated from the supernatant by centrifugation or microfiltration and optionally washed with a sufficient quantity of acidified demineralized water to the desired α-La content. The fractionation of step d) is preferably carried out at a pH between 4.55 and 4.65.

The separated precipitate may subsequently be dispersed in water, and solubilized at a pH $\geq 6$, and optionally dried by e.g. atomization.

The supernatant or permeate, indicated as the β-Lg enriched fraction, may, optionally, after neutralization at a pH>6, be concentrated and spray-dried for use as a highly functional WPI ($\geq 90\%$ protein) or as a defatted WPC after mixing-up with the permeate obtained from the desalting ultra- or diafiltration step mentioned hereinabove.

A preferred embodiment of the process of the invention is characterized in that the α-lactalbumin enriched fraction is solubilized at pH 6.0, preferably $\geq 6.5$, by using Na, K, and/or Ca salts, esp. hydroxides. A solubilization using a calcium salt will give the natural and most stable form of α-La.

In the α-La enriched fraction, the α-La/β-Lg ratio can be increased by subjecting the solubilized α-La precipitate to a microfiltration step using a fine membrane. It is necessary that the α-La molecules can pass the membrane, whereas β-Lg, other proteins and agglomerates such as immunoglobulines are in essence too large to pass the membrane. Preferably, the microfiltration membrane has an average pore diameter smaller than 0.3 μm.

Finally, the invention relates to the enriched α-lactalbumin fractions and the enriched β-lactoglobulin fractions isolated by the recovery process according to the invention.

The invention will be described by the following nonlimiting examples.

EXAMPLE 1

50 liters of Gouda whey (pH 6.5) were subjected to ultrafiltration at 50° C. in a Millipore/Pellikan UF unit, installed with 0.46 m² plate membrane (cut-off 10,000), and defatted by sedimentation as described in NL 173 912. The resulting WPI solution (10% protein; pH 6.5) was split-up in 8 samples of 200 ml and each of these samples were mixed-up with an excess (125 g) of the cation resin Amberlite® "XA-60". The (8) mixtures were gently stirred for one hour at temperatures of 4°, 20°, 21.5°, 23°, 26°, 29°, 40° and 50° C., respectively.

After separation of the resin by sedimentation the precipitates were washed with 200 ml demineralized water, and the pH (4.3) of the filtrates adjusted to 4.6 with NaOH. Subsequently these samples were stored for another hour at the above-mentioned temperatures, respectively. The α-La precipitates formed were separated by centrifugal force (3.000 g) during 20 minutes, giving crystal clear β-fractions as supernatants. The α-La precipitates were subsequently washed with (citric acid) acidified water at pH 4.6 and solubilized at pH 6.7, using a mixture of Me(OH) in the (Me) proportion of Ca:K:Na=2.5:1:1.5.

The washed and solubilized α-La products (α-fractions), the β-fractions and the initial WPI were analyzed on total protein (Kjehldal), undenatured α-La and β-Lg using High Performance Size Exclusion Chromatography (HPSEC) in phosphate buffer at pH 7.0. The chromatograms obtained from the α- and β-fractions (shown in FIG. 1A and 1B) indicate 62% α-La/protein and 85% β-Lg/protein in these products, respectively. The recovery of total protein, α-La and β-Lg in the α-fractions (calculated on the basis of the amounts present in WPI), are shown in FIG. 2. These results indicate, that optimal separation of α-La from β-Lg occurs between 20° and 50° C., with a maximal separation between 25° and 30° C., giving about 80% α-La-recovery and 85% β-Lg-recovery from WPI.

EXAMPLE 2

Figure 3:
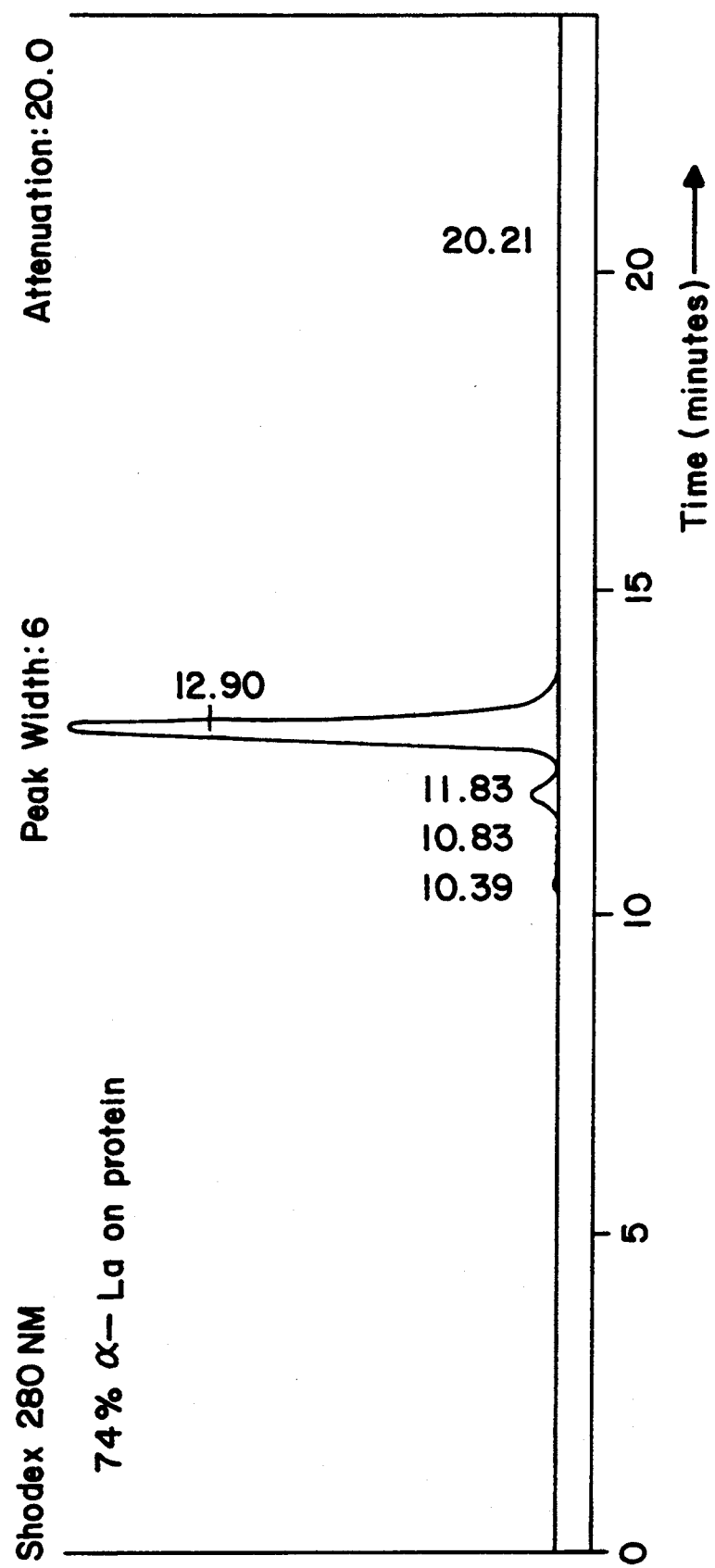
FIG. 3 illustrates and HPSEC chromatogram with respect to the α-lactalbumin-containing fraction.

The solubilized α-La fraction obtained in Example 1 was sterilized, using microfiltration (membrane pores 0.1 μm). The HPSEC chromatogram of the sterile α-La fraction is shown in FIG. 3. It indicates 74% α-La/protein and 13% β-Lg/protein at an overall α-La-recovery of 70% from WPI.

EXAMPLE 3

The procedure for the preparation of the α-La precipitate was repeated at 26° C., in a similar way as described in Example 1. Separation of the α-La precipitate was achieved now by using microfiltration (Millipore∼Pellikan, membrane pores: 0.45 μm) and diafiltration (300%) with citrate buffer (pH 4.6) using the same equipment. The recovery of total protein, α-La and β-Lg from WPI are, within experimental error, identical to those mentioned in Example 1.

EXAMPLE 4

Dried defatted WPI, prepared by the sedimentation procedure as described in Example 1, was diluted with permeate obtained from the ultrafiltration of whey, to obtain defatted WPC's. Four WPC's were prepared: WPC-35, WPC-60, WPC-70 and WPC-80, containing 35, 60, 70 and 80% proteins on solids respectively. 200 ml of solutions of these WPC's (10% protein) were mixed with 125 g of the cation resin "XA-60", and gently stirred for 1 hour at 26° C. After separation of the resin by sedimentation and washing, the pH-values of the filtrates were 1.8, 3.1, 3.5 and 3.8, respectively. These pH-values were adjusted to pH 4.6, using NaOH, before a storage time of 1 hour at 26° C. The α-La precipitates formed were separated by centrifugation (3.000 g during 20 minutes) and this was repeated after one washing step of the precipitate using (citric acid) acidified demineralized water at pH 4.6. The α-La/protein content in the α-fractions (using HPSEC in phosphate buffer pH 7.0) are 20% (from WPC-35), 40% (from WPC-60), 45% (from WPC-70) and 50% (from WPC-80). These results are worse than those obtained from WPI (60%). Moreover the ratio α-La/β-Lg in the α-fraction reduced from 7 (in WPI) to 4 in WPC-35. This indicates that pHvalue's ≦3.8 (obtained after contact with resin) significantly limits the recovery of α-La, and lowers the α-La/β-Lg ratio.

EXAMPLE 5

The experiment described in Example 4 was repeated, using a commercial available WPI, BIPRO ®. After separation of the resin by sedimentation and filtration the pH of the filtrate was 5.1. This pH-value was adjusted to pH 4.6, using (citric acid) acidified demineralized water, upon which no sedimentation of protein occurred at all, and as a consequence no recovery of α-La was observed. This indicates that pH 5.1 (obtained after contact with resin) is above the limit for recovery of α-La.

Figure 4:
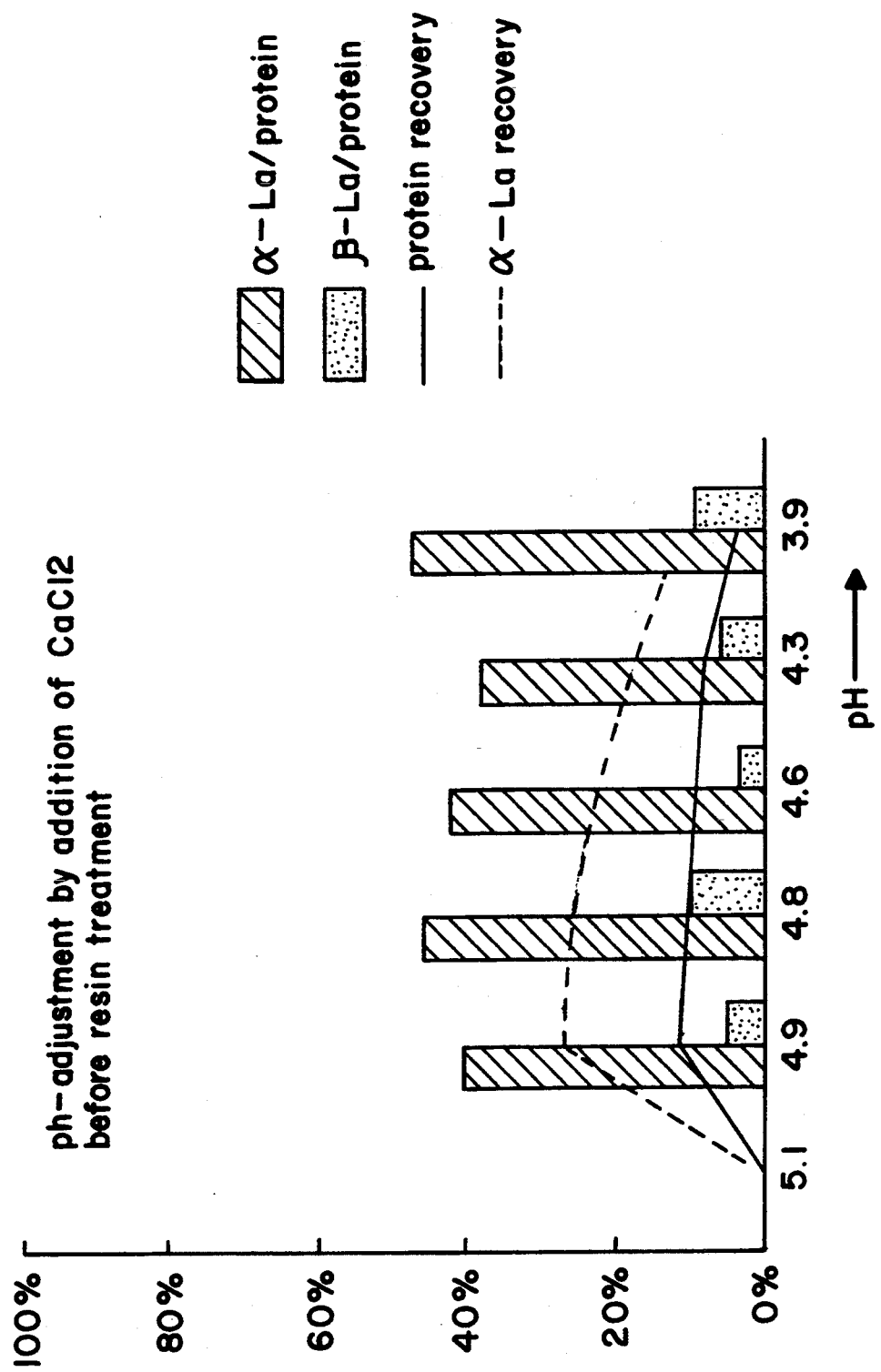

This experiment was repeated using five 10% BIPRO solutions containing 0.15, 0.3, 0.6, 1.2 and 1.8% $CaCl_2$, respectively. After an equilibration time of 1 hour at room temperature, the solutions were mixed-up with "XA-60" resin and treated as described above. The results shown in FIG. 4 indicate optimal separation of α-La and β-Lg between calciuminduced pH-values of 4.9 and 3.9 with still reduced recoveries of α-La and protein compared to the results obtained in Example 1 (see FIG. 2).

EXAMPLE 6

60,000 l of Gouda cheese whey was ultrafiltrated at 50° C. to 95% VR in an ABCOR UF equipment, provided with spiral wound membranes (cut-off 5,000). The WPC was subsequently defatted by sedimentation as described in Dutch Patent 173 912. After a precipitation period of 40 hours at 10° C., the supernatant was decanted, adjusted to pH 6.5, and subjected to a second ultrafiltration up to 90% volume reduction at 50° C. 840 l of the thus obtained WPI was cooled to 26° C. and mixed with 500 l of the cation exchanger "XA-60". After a (gently) stirring period of 1 hour, the cation exchanger was removed by sieve filtration and washed with 600 l acidified demineralized water at pH 4.6. The protein solution and the wash water from the resin were mixed, resulting in a solution of 5% total solids, which was stored for 1 hour at 26° C. The protein flocs formed during storage were separated by means of a Westfalia separator type SB 7. In order to keep the temperature of the sediment below 30° C., the centrifuge was cooled with chilled water.

The sediment was washed twice by diluting it with the same amount of acidified water having a pH of 4.6 and a temperature of 26° C. Subsequently the sediment was separated using above mentioned centrifuge.

Finally the (α-La enriched) sediment was neutralized to pH 6.7, using a mixture of NaOH, KOH and Ca-$(OH)_2$. The protein recovery was 18%, at a compostion of 90% protein/TS, 62% α-La/protein and 8% β-Lg/protein.

EXAMPLE 7

Figure 5:
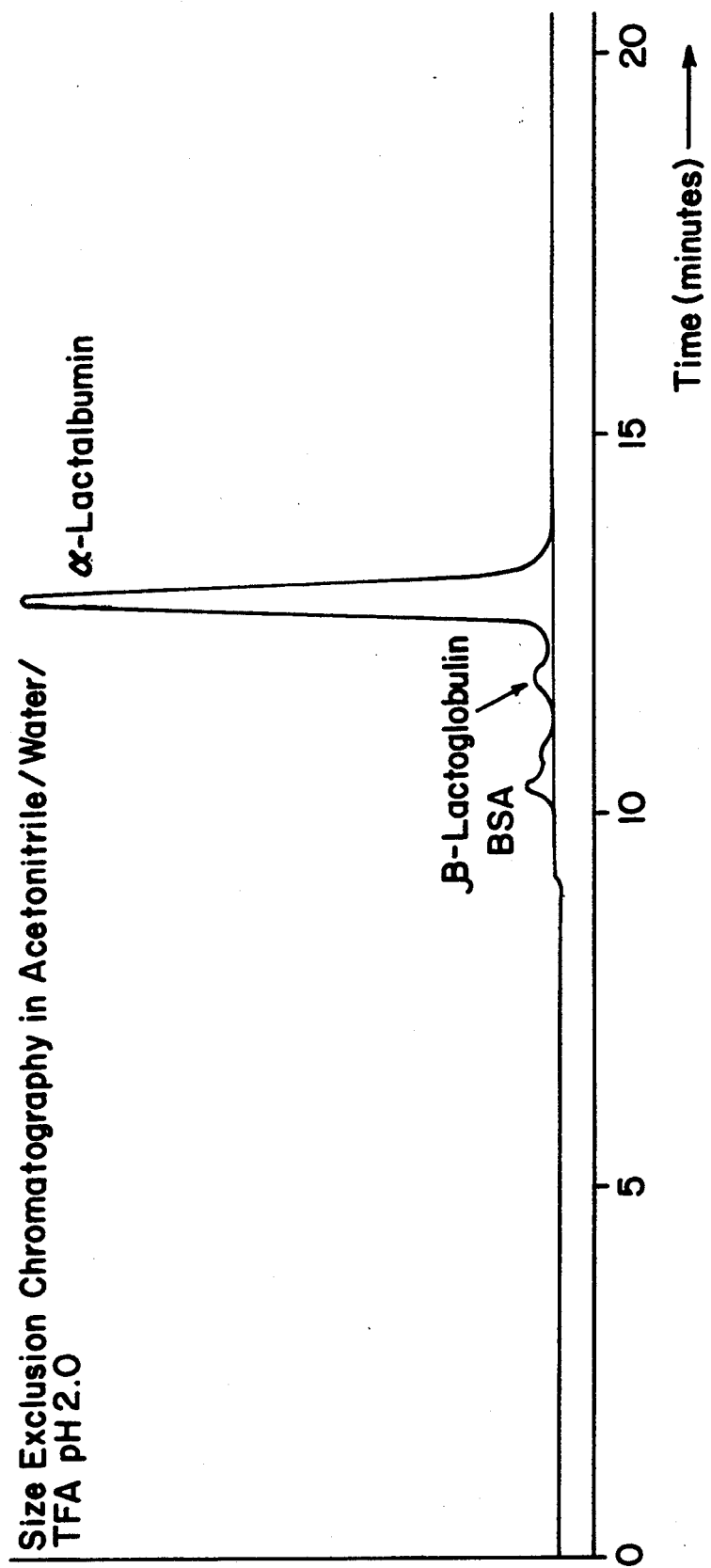
FIG. 5 illustrates an HPSEC chromatogram for the recovery of α-lactalbumin from β-lactoglobulin in accordance with the practices of this invention wherein there are illustrated the results of the practice of this invention indicating the optimal separation of α-lactalbumin and β-lactoglobulin.

The experiment described in Example 6 was repeated, using 780 l of the WPI recovered in that experiment. After the cation-induced protein flocculation, the obtained (5% protein) suspension was concentrated four times, using cross flow microfiltration provided with ALOX ceramic membranes, having a pore diameter of 0.5 μm. The temperature during microfiltration was kept at 26° C. The protein recovery of the a fraction was 20% at a α-La/β-Lg ratio of 8. A HPSEC chromatogram of this product is shown in FIG. 5. The composition of the β-fraction was 83% β-Lg and 4% α-La.

We claim:

1. A process using selective fractionation of α-lactabumin and β-lactoglobulin, for the recovery of α-lactalbumin and/or β-lactoglobulin enriched whey protein concentrate from an initial whey protein product, characterized by the steps:
    a) incubating a solution comprising said whey protein product with a calcium-binding ionic exchange resin in its acid form to initiate the instabilization of α-lactalbumin,
    b) adjusting the pH of the treated protein product solution of step a) to a value between 4.3 and 4.8, after separation of said resin,
    c) incubating the treated protein product solution of step b) at a temperature between 10° and 50° C. to promote the flocculation of α-lactalbumin,
    d) fractionating the proteins in the protein product solution of step c) at pH 4.3–4.8, providing an α-lactalbumin enriched fraction and a β-lactoglobulin enriched fraction,
    e) raising the pH of the α-lactalbumin enriched fraction sufficiently to solubilize the α-lactalbumin fraction, and
    f) optionally raising the pH of the β-lactoglobulin enriched fraction sufficiently to neutralize the β-lactoglobulin fraction.

2. The process according to claim 1, characterized in that the protein concentration in the initial whey protein product varies between 0.7 and 15%.

3. The process according to claim 1, characterized in that said initial whey protein product is defatted.

4. The process according to claim 1 characterized in that the pH-value of said initial whey protein product is at least 5.

5. The process according to claim 1 characterized in that step a) is carried out at a temperature between 10° and 50° C.

6. The process according to claim 1 characterized in that the calcium-binding ion-exchanger is a strong acid ion exchanging resin.

7. The process according to claim 1 characterized in that the duration of the incubation of step a) is at least 30 minutes.

8. The process according to claim 1 characterized in that the pH-value of the incubated solution of step a) varies between 3.5 and 5.0.

9. The process according to claim 1 characterized in that the pH in step b) is adjusted to a value between 4.55 and 4.65.

10. The process according to claim 1 characterized in that the temperature in step c) varies between 25° and 30° C.

11. The process according to claim 1 characterized in that the duration of the incubation of step c) is at least 30 minutes.

12. The process according to claim 1 characterized in that the fractionation of step d) is effected by centrifugation or microfiltration.

13. The process according to claim 1 characterized in that the fractionation of step d) is carried out at a pH between 4.55 and 4.65.

14. The process according to claim 1 characterized in that the α-lactalbumin enriched fraction is solubilized at pH≧6.

15. The process according to claim 14, characterized in that the α-lactalbumin enriched fraction is solubilized by using Na, K, and/or Ca hydroxides.

16. The process according to claim 1 characterized in that the α-lactalbumin enriched fraction is subjected to a microfiltration step, using a membrane with an average pore diameter smaller than 0.3 μm.

17. The process according to claim 1 characterized in that the β-lactoglobulin enriched fraction is neutralized at pH>6, followed by drying.

* * * * *